(12) United States Patent
Williams

(10) Patent No.: US 9,982,747 B2
(45) Date of Patent: May 29, 2018

(54) DAMPER HUB ASSEMBLY AND METHOD OF FORMING THE SAME

(71) Applicant: FORD GLOBAL TECHNOLOGIES, LLC, Dearborn, MI (US)

(72) Inventor: Rick L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 14/692,778

(22) Filed: Apr. 22, 2015

(65) Prior Publication Data

US 2016/0312853 A1    Oct. 27, 2016

(51) Int. Cl.
| | |
|---|---|
| F16F 15/129 | (2006.01) |
| F16F 15/14 | (2006.01) |
| B29L 9/00 | (2006.01) |
| B29L 31/00 | (2006.01) |
| B29K 507/04 | (2006.01) |
| B29K 705/00 | (2006.01) |

(52) U.S. Cl.
CPC ........ *F16F 15/129* (2013.01); *B29K 2507/04* (2013.01); *B29K 2705/00* (2013.01); *B29L 2009/003* (2013.01); *B29L 2031/721* (2013.01); *F16F 15/1428* (2013.01)

(58) Field of Classification Search
CPC .......... F16F 15/30; F16F 15/3153; F16F 7/02; F16F 7/04; F16F 7/06; F16F 7/08; F16F 7/09; F16F 9/12; F16F 9/145; F16F 14/1442; F16F 15/121; F16F 15/129; F16H 55/36; F16H 2055/366; F16H 57/0006; F16H 55/366; B60K 25/02; F16D 57/02; F16D 65/0006; F16D 65/10; F16D 3/12; F16D 3/14; F16D 41/206; D06F 37/20; D06F 37/24; B60G 13/04; B60G 17/06; E05Y 2201/21; E05Y 2201/266; F02B 67/06
USPC ............... 188/381, 290, 130; 74/433.5, 439; 29/894
See application file for complete search history.

(56) References Cited

U.S. PATENT DOCUMENTS

| | | | | |
|---|---|---|---|---|
| 4,178,811 A | * | 12/1979 | Shepherd | F16F 15/136 |
| | | | | 188/17 |
| 5,449,322 A | * | 9/1995 | Wagner | F16F 15/1442 |
| | | | | 464/90 |
| 5,465,485 A | * | 11/1995 | Miyake | F16F 15/126 |
| | | | | 29/892.11 |

(Continued)

FOREIGN PATENT DOCUMENTS

| | | | | |
|---|---|---|---|---|
| DE | 4328596 A1 | * | 3/1995 | ............ F16F 15/126 |
| DE | 4328596 A1 | * | 3/1995 | ............ F16F 15/126 |

(Continued)

OTHER PUBLICATIONS

Machined translation of JP—07208549 A.*

Primary Examiner — Robert A. Siconolfi
Assistant Examiner — San Aung
(74) Attorney, Agent, or Firm — LeClairRyan

(57) ABSTRACT

In one or more embodiments, a damper hub assembly includes a hub with a through-aperture defined by an aperture wall and to receive therein a portion of a crankshaft, the aperture wall including face and back surfaces and a wall surface positioned there-between, and an insert contacting the face and back surfaces and the wall surface.

18 Claims, 2 Drawing Sheets

(56) References Cited

U.S. PATENT DOCUMENTS

| | | | |
|---|---|---|---|
| 5,591,093 A * | 1/1997 | Asai | F16D 3/76 474/902 |
| 6,167,782 B1 * | 1/2001 | Chevalier | F16F 15/1207 474/237 |
| 6,332,842 B1 * | 12/2001 | Tabuchi | F16D 9/06 403/11 |
| 6,675,759 B2 | 1/2004 | Johnson et al. | |
| 2002/0129675 A1 * | 9/2002 | Watanabe | F16F 15/1203 74/574.4 |
| 2006/0172832 A1 * | 8/2006 | Watanabe | F16F 15/126 474/94 |
| 2008/0047392 A1 | 2/2008 | Ciaccio | |
| 2009/0176583 A1 * | 7/2009 | Dell | F16D 3/02 464/40 |
| 2009/0194380 A1 * | 8/2009 | Ali | F16F 15/121 188/381 |
| 2012/0231909 A1 | 9/2012 | Shin | |

FOREIGN PATENT DOCUMENTS

| | | | | |
|---|---|---|---|---|
| JP | 07208549 A | * | 8/1995 | F16F 15/136 |
| JP | 07208549 A | * | 8/1995 | F16F 15/136 |

\* cited by examiner

DAMPER HUB ASSEMBLY AND METHOD OF FORMING THE SAME

TECHNICAL FIELD

The disclosed inventive concept relates generally to a damper hub assembly and to a method of forming the same.

BACKGROUND

Torsional vibration damper may be used to reduce torsional vibrations due to torque exerted on the crankshaft of a vehicle engine.

For instance, publication US2008/0047392A1 discloses a torsional vibration hub assembly with a rubber insert to deliver torsional vibration control.

SUMMARY

In one or more embodiments, the present invention provides a damper hub assembly, which includes a hub with a through-aperture defined by an aperture wall and to receive therein a portion of a crankshaft, the aperture wall positioned between face and back surfaces, and an insert contacting the face and back surfaces and the aperture wall.

In another or more embodiments, the present invention provides a method of forming a damper hub assembly, the method including providing an insert, the insert including anterior and posterior portions and a middle portion positioned there-between, the middle portion being of a radial width smaller than that of the anterior or posterior portion, and contacting the anterior, the posterior and the middle portions with a fluid material via injection molding to form a hub supported on the insert.

One or more advantageous features will be readily apparent from the following detailed description of one or more embodiments when taken in connection with the accompanying drawings.

BRIEF DESCRIPTION OF THE DRAWINGS

For a more complete understanding of one or more embodiments of the present invention, reference should now be made to the one or more embodiments illustrated in greater detail in the accompanying drawings and described below by way of examples wherein.

DETAILED DESCRIPTION OF ONE OR MORE EMBODIMENTS

Figure 1:
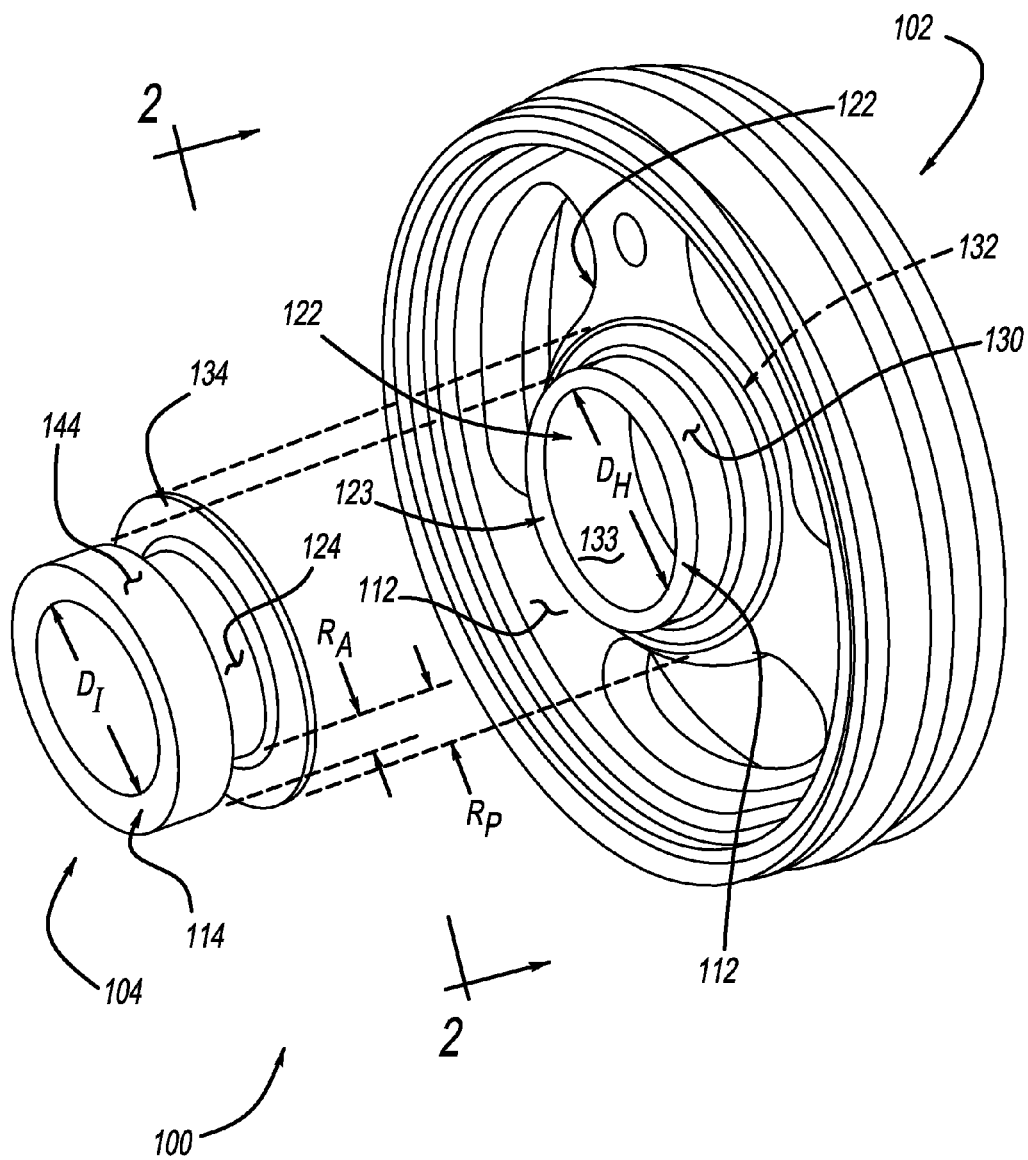
FIG. 1 illustratively depicts an exploded, perspective view of a damper hub assembly in one or more embodiments.

As referenced in the figures, the same reference numerals are used to refer to the same components. In the following description, various operating parameters and components are described for different constructed embodiments. These specific parameters and components are included as examples and are not meant to be limiting. The drawings referenced herein are schematic and associated views thereof are not necessarily drawn to scale.

As is detailed herein elsewhere, the present invention in one or more embodiments is believed to be advantageous in providing a damper hub assembly with relatively simplified structure, reduced weight and enhanced performance stability.

In one or more embodiments, and as illustratively depicted in FIG. 1, a damper hub assembly generally shown at 100 includes a hub 102 and an insert 104, the hub 102 being with a through-aperture 122 defined by an aperture wall portion 123 and to receive therein a portion of a crankshaft (not shown), the aperture wall portion 123 including a face surface 112, a back surface 132, and a wall surface 133 positioned between the face and back surfaces 112, 132, where the insert 104 contacts the face surface 112, the back surface 132 and the wall surface 133 of the aperture wall portion 123 of the hub 102. In certain embodiments, the face and back surfaces 112, 132 may be the outer most surfaces defining the through-aperture 122, where the outer most surfaces are surfaces next to atmospheric air in an unassembled state, for instance, without being assembled to the insert 104.

Referring back to FIG. 1, the insert 104 may include an anterior portion 114 contacting the face surface 112, a posterior portion 134 contacting the back surface 132, and a middle portion 124 positioned between the anterior and posterior portions 114, 134 and contacting the wall surface 133 of the aperture wall portion 123.

Figure 2:
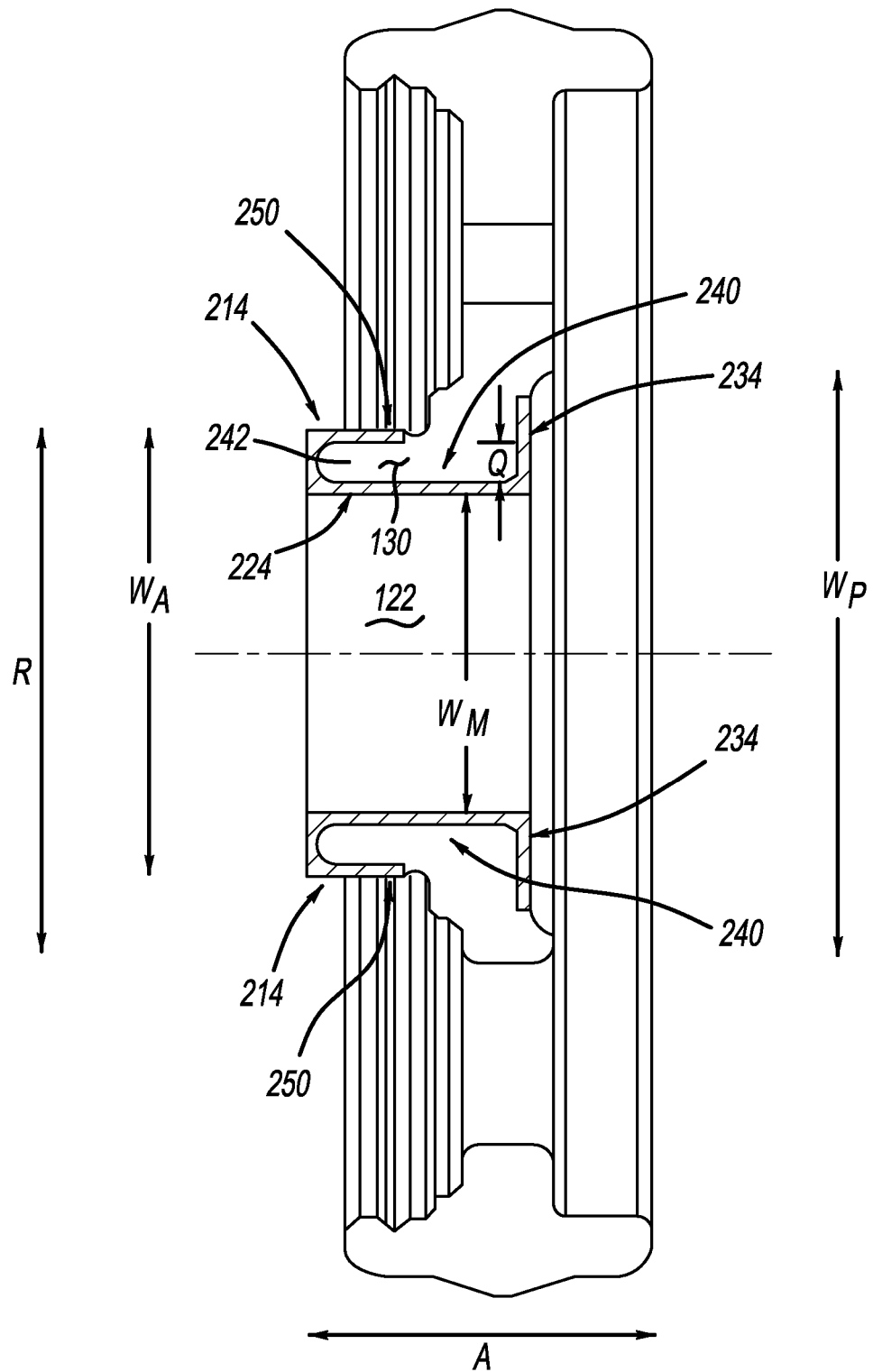
FIG. 2 illustratively depicts a cross-sectional view, taken along line 2-2, of the damper hub assembly referenced in FIG. 1.

In particular, and further in view of FIG. 2, the anterior portion 114 may be configured to define a pocket 144 opening out toward the posterior portion 134, where the pocket 144 is to receive a face portion 130 of the hub 102, where the face portion 130 includes at least partially the face surface 112 and the aperture wall portion 123. This configuration is believed to be beneficial in that the aperture wall portion 123 in an assembled state is stably positioned between the anterior and posterior portions 114, 134 of the insert 104 and supported on the middle portion 124 of the insert 104. Accordingly, unwanted movement along an axial direction "A" may be effectively reduced.

In addition, and due to the configuration that the face portion 130 of the hub 102 is received within the pocket 144 of the insert 104, unwanted movement along a radial direction "R" may also be effectively reduced. Because the face portion 130 may be received within the pocket 144 of the insert 104, an inner diameter "$D_H$" of the through-aperture 122 is smaller in value than an inner diameter "$D_I$" of the insert 104. The diameter $D_H$ and the diameter $D_I$ may be of any suitable value, with non-limiting examples thereof including 26.0 to 32.0 millimeters (mm) or 26.5 to 31.5 mm for $D_H$ and 28.0 to 34 mm or 28.5 to 33.5 mm for $D_I$.

As mentioned herein elsewhere, the insert 104 with the pocket 144 thus configured may be particularly beneficial during formation of the damper hub assembly 100, where the pocket 144 may effectively provide a desirable level of confinement and stationary support for the formation of the hub 102 on and around the insert 104 during an injection molding process.

In certain embodiments, and as illustratively depicted in FIG. 1 and FIG. 2, at least one of the anterior and posterior portions 114, 134 is of an outer perimeter greater than that of the middle portion 124.

As mentioned herein elsewhere, FIG. 2 illustratively depicts a cross-sectional view of the damper hub assembly 100 referenced in FIG. 1 taken along line 2-2, wherein the cross-section is depicted to include along the axial direction "A" anterior and posterior sections 214, 234 and a middle section 224, respectively, corresponding to the anterior and posterior portions 114, 134 and the middle portion 124 of the insert 104 depicted in FIG. 1.

Referring back to FIG. 2, the middle section 224 is depicted to be positioned between the anterior and posterior portions 214, 234. The anterior, the posterior and the middle sections 214, 224, 234 collectively define a recess 240 to contact at least the face portion 130 of the hub 102. The recess 240 includes a section 242 of the pocket 144 referenced in FIG. 1.

Referring back to FIG. 2, a radial width "$W_A$" of the anterior portion 114 or its corresponding anterior section 214 may be greater than a radial width "$W_M$" of the middle portion or its corresponding middle section 224, along radial direction "R". Optionally also, a radial width "$W_P$" of the posterior portion 134 or its corresponding posterior section 234 is greater than the radial width "$W_M$" along the radial direction "R". In certain instances, the radial width values may be in this order $W_P > W_A > W_M$. This arrangement is believed to effectively ensure the formation of the recess 240 and a stable attachment of the hub 102 to the insert 104. $W_P$, $W_A$ and $W_M$ may each be of any suitable value, with non-limiting examples of the value for $W_P$ being 42.5 to 48.5 mm or 43.0 to 48.0 mm, for $W_A$ being 36.5 to 42.5 mm or 37.0 to 42.0 mm and for $W_M$ being 26.0 to 32.0 mm or 26.5 to 31.5 mm.

The anterior section 214 of the insert 104 is depicted in FIG. 2 to include a lip 250 extending toward the posterior section 234 and spaced apart from the middle section 224 with a distance "Q" which corresponds to a cross-sectional dimension of the pocket 144 referenced in FIG. 1. The area defined between the lip 250 and the middle section 224 is advantageously positioned to receive portions of the hub 102 and hence to facilitate relatively enhanced attachment. Distance Q may be of any suitable values, with non-limiting examples thereof including 3.0 to 6.0 mm or 3.25 to 5.75 mm.

Referring back to FIG. 1 and in view of FIG. 2, the posterior portion 124 may be presented with a distance "$R_P$" relative to the middle portion 124 and the anterior portion 114 may be presented with a distance "$R_A$" relative to the middle portion 124. The distance $R_P$ and the distance $R_A$ may be independently of any suitable value, with non-limiting examples of value $R_P$ being of 7.0 to 10.0 mm or 7.25 to 9.75 mm and of value RA being of 3.0 to 6.0 mm or 3.25 to 5.75 mm.

Referring back to FIG. 1 and further in view of FIG. 2, a non-limiting method may be provided to form the damper hub assembly 100. In this method, the insert 104 may have been pre-formed and ready for subsequent assembly. For durability and strength consideration, the insert 104 may be formed as an integral piece with all its features such as the anterior and posterior portions 114, 134 and the middle portion 124 all formed integral to one another. This pre-formation may be carried out via molding of a metallic material such as steel. This pre-formed insert 104 is subsequently contacted at its anterior, middle and posterior portions 114, 124, 134 with a fluid material via injection molding to form the hub 102 as supported on the insert 104.

In certain embodiments and as dependent upon particular projects at hand, the fluid material may be carried out to contact the middle portion 124 prior to contacting the anterior or the posterior portions 114, 134. Of course, in certain other embodiments, the fluid material may contact the posterior portion 134 prior to contacting the anterior portion 114 or the middle portion 124. The order by which various portions of the insert 104 are contacted by the fluid material may be modified as needed.

In certain embodiments, the hub 102 differs in material from the insert 104 or the hub 102 includes a first material and the insert 104 includes a second material different from the first material. This is believed to be beneficial in that the insert 104 may be constructed out of or include the second material that is targeted for strength and torsion resistance, while the hub 102 may be constructed out of or include the first material that is targeted relatively more for its overall weight benefit. As mentioned herein elsewhere, and when the hub 102 is injection molded onto the insert 104, the first material may be an injection moldable material or a precursor, an intermediate or a product thereof, with non-limiting examples thereof including polymers and carbons. Accordingly the second material as included in the insert 104 may be a metallic material such as neat metals and/or metal alloys. In certain instances, a small amount of polymers and/or carbons may also be included in the insert 104 to prime its surface for subsequent injection molding. In this connection, the first and second materials may also differ in their respective melting points.

In one or more embodiments, the present invention as set forth herein is believed to have overcome certain challenges associated with damper hub assemblies. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A damper hub assembly, comprising:
   a hub including a through-aperture defined by an aperture wall and to receive therein a portion of a crankshaft, the aperture wall including face and back surfaces and a wall surface positioned there-between; and
   an insert including a priming material, said priming material consisting of at least one of a polymer and a carbon material, the insert further including an anterior portion contacting the face surface of the hub, a posterior portion contacting the back surface of the hub, and a middle portion positioned between the anterior and posterior portions and contacting the wall surface of the hub.

2. The damper hub assembly of claim 1, wherein at least one of the anterior and posterior portions is of an outer perimeter greater than that of the middle portion.

3. The damper hub assembly of claim 1, wherein a cross-section of the insert along an axial direction includes anterior and posterior sections and a middle section positioned there-between, the middle anterior section being of a middle radial width smaller an anterior axial thickness greater than that a posterior axial thickness of the anterior or posterior section, and the anterior section being of an anterior radial width smaller than a posterior radial width of the posterior section.

4. The damper hub assembly of claim 1, wherein at least one of the anterior and posterior portions is integral to the middle portion.

5. The damper hub assembly of claim 1, wherein a cross-section of the insert along an axial direction includes anterior and posterior sections and a middle section positioned there-between, the anterior, the posterior and the middle sections collectively defining a recess to contact a portion of the hub.

6. The damper hub assembly of claim 5, wherein the anterior section of the cross-section of the insert further includes a lip extending toward the posterior section.

7. The damper hub assembly of claim 1, wherein the hub includes a first at least one of a polymer and a carbon material and the insert includes a metallic second material different from the first material.

8. A method of forming a damper hub assembly, comprising:
providing an insert, the insert including anterior and posterior portions and a middle section positioned there-between, the middle portion being of a radial width smaller than that of the anterior or posterior portion;
priming the insert with a priming material, said priming material consisting of at least one of a polymer and a carbon material prior to the contacting with a fluid material; and
contacting the anterior, the posterior and the middle portions with a fluid material via injection molding to form a hub supported on the insert.

9. The method of claim 8, wherein the fluid material contacts the middle portion prior to contacting the anterior or the posterior portions.

10. The method of claim 8, wherein the fluid material is provided to include a carbon material.

11. The method of claim 8, wherein the insert is provided to include a metallic material, and the hub is formed to include at least one of a polymer and a carbon material.

12. The method of claim 8, wherein the anterior, middle and posterior portions of the insert are provided as integral to one another via molding.

13. A damper hub assembly, comprising:
a hub including a through-aperture defined by an aperture wall and to receive therein a portion of a crankshaft, the aperture wall including face and back surfaces and a wall surface positioned there-between; and
an insert including a priming material, said priming material consisting of at least one of a polymer and a carbon material, said insert including an anterior portion contacting the face surface, a posterior portion contacting the back surface, and a middle portion positioned between the anterior and posterior portions and contacting the wall surface, wherein a cross-section of the insert along an axial direction includes anterior and posterior sections and a middle section positioned there-between, the anterior section being of an anterior radial width greater than a middle radial width of the middle section.

14. The damper hub assembly of claim 13, wherein the posterior section is of a posterior radial width greater than the anterior radial width, and wherein the posterior section is of a posterior axial thickness smaller than an anterior axial thickness of the anterior section.

15. The damper hub assembly of claim 13, wherein at least one of the anterior and posterior portions is integral to the middle portion.

16. The damper hub assembly of claim 13, wherein the anterior section of the cross-section of the insert further includes a lip extending toward the posterior section.

17. The damper hub assembly of claim 13, wherein the hub includes a first material and the insert includes a metallic second material different from the first material.

18. The damper hub assembly of claim 13, wherein at least one of the anterior and posterior portions is of an outer perimeter greater than that of the middle portion.

* * * * *